Oct. 7, 1958
C. B. BRAHM
2,854,913
FLOW CONTROL MEANS FOR AN AIRCRAFT AIR CONDITIONING SYSTEM
Filed Dec. 13, 1956
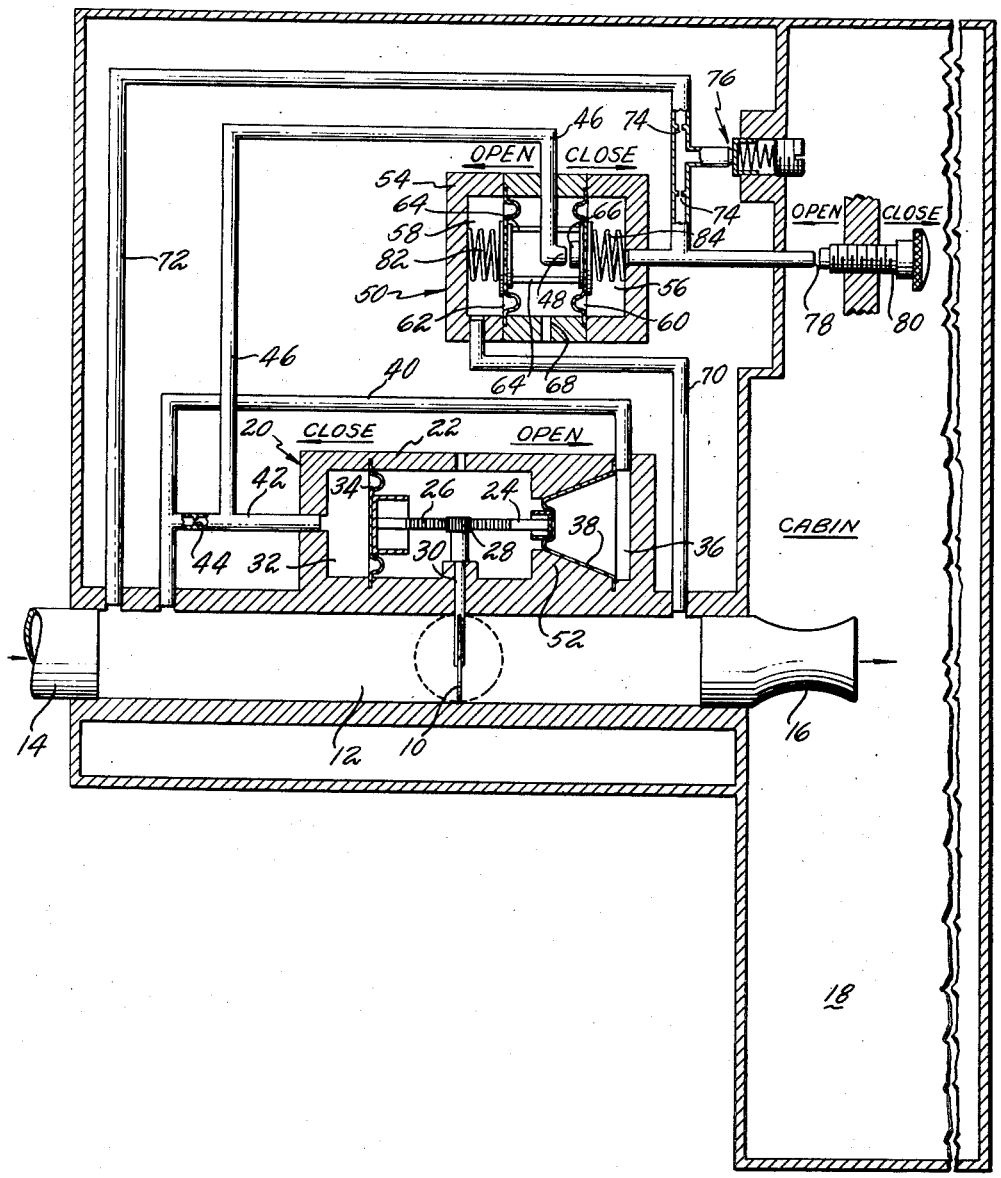
INVENTOR
CHARLES B. BRAHM
BY Teller & McCormick
ATTORNEYS

United States Patent Office 2,854,913
Patented Oct. 7, 1958

2,854,913

FLOW CONTROL MEANS FOR AN AIRCRAFT AIR CONDITIONING SYSTEM

Charles B. Brahm, Rockville, Conn., assignor to United Aircraft Corporation, East Hartford, Conn., a corporation of Delaware Application December 13, 1956, Serial No. 628,087

7 Claims. (Cl. 98—1.5)

This invention relates to control mechanism for a valve which is utilized in an aircraft air conditioning system to control the flow rate through a conduit or the discharge rate of a nozzle connected with the conduit.

It is the general object of the invention to provide in an aircraft air conditioning system means for selecting a flow rate or discharge rate from the system and for controlling a valve to maintain the selected flow rate despite changes in pressure within the system and despite changes in pressure in the cabin or compartment receiving the discharge.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure or view of the drawing is a schematic illustration of a flow control valve and its operating and control mechanism provided in accordance with this invention.

With more specific reference to the drawing, it will be observed that the flow control valve 10 is a butterfly type throttle valve which is rotatably supported in a passage 12 through which air flows under pressure from a conduit 14 to a discharge nozzle 16. The conduit 14 forms a part of an aircraft air conditioning system and the discharge nozzle 16 is shown as opening into the aircraft cabin 18. In a preferred installation, the nozzle 16 is not provided as the main inlet for the chain, but it is provided to direct warm or hot air on the cabin windshield to prevent fogging and icing, and for this purpose it is highly desirable to provide a constant flow rate. It is also desirable to provide means whereby the pilot can select the flow rate which he finds to be most suitable for the purposes mentioned.

The construction of the air conditioning system and the manner in which it supplies temperature controlled compressed air to the cabin 18 for the comfort of occupants forms no part of the present invention and for this reason the system has not been shown. However, reference may be had to the U. S. application of John C. Beggs and Harvey W. Carrier, Serial No. 628,032, filed of even date herewith, for a disclosure of a general purpose aircraft air conditioning system which includes a warm or hot air conduit such as the conduit 14, the said warm or hot air conduit being designated by the reference 34 in the Beggs and Carrier application.

There is no problem involved in selecting and maintaining a fixed flow rate through the nozzle 16 if the supply pressure at the conduit 14 is constant and if the pressure in the cabin 18 is constant. Under such ideal conditions, the valve 10 can be set to a rotated position to provide a fixed pressure drop through the nozzle and thus a constant flow rate. However, such ideal conditions do not prevail in aircraft air conditioning systems because the pressure varies at the supply conduit and in the cabin for various reasons. Therefore, in order to maintain substantially constant nozzle flow it is necessary to adjust the position of the throttle valve 10 to compensate for changes in inlet pressure and also to compensate for changes in cabin pressure.

In accordance with the present invention, mechanism is provided for automatically adjusting the throttle valve 10 to compensate for the aforesaid pressure changes, and the said mechanism includes manually operable means for selecting a nozzle flow rate. Included in the valve control mechanism is a fluid pressure responsive valve actuator indicated generally by the reference numeral 20. The valve actuator 20 comprises a cylinder 22 which accommodates a reciprocable piston 24. The piston has integral gear teeth forming a rack 26 or a gear rack can be secured to the piston to engage a pinion 28 which is fixed to the end of the shaft 30 of the throttle valve 10 whereby reciprocation of the piston will oscillate the valve. In the form shown, movement of the piston 24 toward the left will close the throttle valve 10 and piston movement toward the right will open the throttle valve.

The piston 24 moves in either direction responsive to fluid pressure, a chamber 32 being defined in the left-hand end of the cylinder 22 whereby fluid pressure can be exerted on the piston through a fixed area diaphragm 34, and a chamber 36 being defined in the right-hand end of the cylinder 22 whereby fluid pressure can be exerted on the piston through a variable area diaphragm 38. A conduit 40 is connected between the chamber 36 and the main flow passage 12 on the inlet or high pressure side of the throttle valve. A branch conduit 42 containing a restriction 44 is connected between the chamber 32 and the aforementioned conduit 40, the restriction 44 being provided to diminish pressure surges in the branch conduit 42 and in the chamber 32 resulting from pressure changes in the inlet or supply conduit 14. While the pressure in the chamber 36 is substantially equal to supply pressure (which for convenience will hereinafter be referred to as P1), the pressure in the chamber 32 is modified from supply pressure by providing a conduit 46 which communicates with the branch conduit 42 and has an orifice at its free end 48. The end 48 of the conduit 46 is disposed in a servo or control unit indicated generally by the reference 50 and which operates to vary the effective opening of the orifice 48 whereby to provide a variable pressure (Pm) in the chamber 32 which is modified from the supply pressure P1. Thus, the actuator chamber 36 contains air at supply pressure P1 which acts upon the piston 24 tending to close the throttle valve and the actuator chamber 32 receives air at the modified pressure Pm which is less than supply pressure and which acts upon the piston to open the throttle valve. It can be said that the conduit 14 provides a source of air under pressure for both actuator chambers, but that the pressure is modified in one of the actuator chambers.

Despite the pressure differential in the actuator chambers favoring the chamber 36 and tending to close the throttle valve, the throttle valve will not necessarily be fully closed because of the variable effective area of the diaphragm 38 in the actuator chamber 36. That is, the wall 52 of the cylinder 22 around the chamber 36 is tapered to converge toward the left so that as the diaphragm 38 is moved toward the left by the pressure P1 it will engage the tapered wall and its effective area will be reduced. Therefore, as the actuator piston is moved toward the left, the piston-moving force of the pressure P1 is reduced due to the reduced effective area of the diaphragm 38 and the piston rate decreases in movement from right-to-left. At some position of the piston 24 in movement toward the left, the force applied thereto by the pressure P1 in the chamber 36 against the diminishing effective area of the diaphragm 38 will be balanced by the lesser pressure P*m* in the chamber 32 which acts upon a fixed area diaphragm 34. When balance is achieved, the throttle valve 10 is held in a rotated or adjusted position in keeping with the differential of the pressures P1 and P*m*. The throttle valve will always be located in the same position for the same pressure differential and each valve position corresponds to a certain pressure differential.

Obviously, the position of the throttle valve 10 determines the pressure drop from the supply or upstream side of the valve to the downstream side thereof and the pressure drop will be different for each valve position. The upstream or supply pressure has hereinbefore been referred to as P1, and for future reference the downstream pressure will be designated P2. As will be more fully understood hereinafter, the valve control mechanism of this invention is designed to maintain a downstream pressure P2 at a fixed amount greater than cabin pressure P3. If cabin pressure P3 remains constant, the downstream pressure P2 must be held constant despite changes in upstream pressure P1. If cabin pressure P3 varies, the downstream pressure P2 must be varied in keeping therewith whether the upstream pressure P1 varies or remains constant. Control of the downstream pressure P2 is effected by adjustment of the valve 10, this being effected by altering the pressure differential P1/P*m* to locate a new balanced position of the actuator piston 24.

The servo or control unit 50 is the means provided in accordance with the present invention automatically to vary the pressure differential P1/P*m* in response to change in the supply pressure P1 or in the cabin pressure P3. The control unit 50 comprises a housing 54 wherein two chambers 56 and 58 are defined to receive air under pressure which will act upon the diaphragms 60 and 62 respectively. The said diaphragms are provided with suitable backing plates which are rigidly connected together as by rods or pins 64, 64 whereby the diaphragms can be moved only in unison and in the same direction within the housing 54. It will be observed that the right-hand diaphragm 60 supports orifice closing means 66 which is movable with the diaphragms relative to the orifice 48 to vary the effective opening thereof. The conduit 46 and its orifice 48 are disposed in an intermediate chamber in the housing 54, the said intermediate chamber having a vent 68, and the orifice is disposed so that its effective opening will be reduced by diaphragm movement toward the left. As will be quite apparent, the pressure P*m* in the conduit 46 and in the actuator chamber 32 will be increased to tend to open the throttle valve 10 when the effective opening of the orifice 48 is reduced and the pressure P*m* will decrease when the effective opening of the said orifice is increased.

Air is supplied to the left-hand chamber 58 in the control unit 50 from a conduit 70 which is connected in the main passage 12 on the downstream side of the throttle valve 10 whereby the chamber 58 always contains air at the variable pressure P2. The chamber 56 contains air at a substantially constant pressure P4 and is supplied through a conduit 72 which is connected to a pressurized source such as the passage 12 on the upstream side of the throttle valve. A substantially constant pressure P4 is provided from variable conduit pressure P1 by the provision of a pair of spaced apart restrictions 74, 74 in the conduit and a spring loaded relief valve 76 in the conduit between the said restrictions. The restrictions 74, 74 diminish pressure surges in the conduit section between them and the relief valve 76 is manually pre-set to maintain a maximum pressure which is less than the supply pressure P1 under all anticipated operating conditions. In addition to the relief valve 76, there is a manually operable valve 80 which is movable relative to an outlet orifice 78 to further the pressure control and the valve 80 provides the means whereby a desired pressure P4 can be selected for the chamber 56. That is, by moving the valve 80 away from the orifice 78, the regulated pressure P4 will be at a lower level than if the valve is moved toward the orifice. It is important to observe that the orifice 78 opens into the aircraft cabin and that the valve 80 is disposed for manipulation and adjustment by the pilot or other occupant of the cabin. It is by adjustment of the valve 80 relative to the orifice 78 that the pilot selects and fixes a flow rate or discharge rate for the de-fogging and de-icing nozzle 16, as will become more apparent from the following description of operation.

For purposes of considering operation, assume that the throttle valve 10 is positioned in the passage 12 to provide the proper pressure drop from supply pressure P1 to nozzle pressure P2 whereby to obtain a nozzle pressure P2 which is a fixed amount greater than cabin pressure P3, and thereby to fix the flow rate through the nozzle. Now, if supply pressure P1 increases, P2 will also increase and nozzle discharge will be increased if the throttle valve is not adjusted to a more closed position whereby to increase the pressure drop to maintain a fixed value of P2. Throttle valve adjustment is effected automatically in the manner following:

The increase in supply pressure P1 will be reflected in increased pressure in the actuator chamber 36 and will act upon the variable area diaphragm 38 tending to move the actuator piston 24 toward the left to effect closing movement of the throttle valve 10. Such closing movement is desirable, and will be aided by operation of the servo or control unit 50. That is, the increase in nozzle pressure P2 will be reflected in increased pressure in the left-hand chamber 58 of the control unit 50 which will force the diaphragms 60 and 62 toward the right since such movement is opposed only by the substantially constant pressure P4 in the right-hand chamber 56. Left-hand movement of the said diaphragms enlarges the effective opening of the orifice 48 to reduce the pressure P*m* in the conduit 46 and in the actuator chamber 32. Thus the pressures differential P1/P*m* in the actuator 20 is increased, the P1 value increasing and the P*m* value decreasing, whereby to effect closing movement of the throttle valve.

Over-correction and needless fluctuation of the throttle valve 10 is avoided in the present construction by means of the control unit 50. That is, as the throttle valve is closed, the nozzle pressure P2 will be reduced toward its former value and the chamber 58 will experience a like reduction in pressure. This permits the diaphragms 60 and 62 to be moved toward the left by the pressure P4 whereby to reduce the effective opening of the nozzle 48 and thereby to increase the pressure P*m* in the actuator chamber 32 which opposes closing movement of the throttle valve. Thus, the construction shown operates automatically to adjust the throttle valve whenever pressure changes occur in the nozzle supply passage, the initial correcting adjustment of the throttle valve being at a relatively rapid rate which rate is reduced automatically after corrective action is instituted whereby to diminish valve fluctuation and over-correction.

In the event the supply pressure P1 decreases instead of increases, the automatic corrective action proceeds in substantially the same way but the throttle valve 10 is opened. That is, the reduced supply pressure P1 is reflected in the actuator chamber 36 to start right-hand piston movement and opening movement of the valve, the reduced nozzle pressure P2 is reflected in the control chamber 58 whereby the orifice 48 is restricted and modified pressure P*m* increases in the actuator chamber 32 to further opening movement of the throttle valve. As nozzle pressure P2 is thus increased, modified pressure P*m* will be reduced to prevent over-correction.

Thus far only variations in supply pressure P1 have been considered in connection with the operation of the flow control means described. While supply pressure variation occurs most frequently, there may also be variation in the cabin pressure P3 which will upset the ratio of P2/P3 and vary the flow. However, the flow control means automatically compensates for variations in cabin pressure and corrects the nozzle pressure P2 in keeping therewith. This will be understood by noting that the control orifice 78 opens in the cabin and, therefore, the pressure P4 in the chamber 56 of the control unit will increase and decrease with changes in cabin pressure P3. That is, if cabin pressure decreases, the flow out of the orifice 78 will be greater and the pressure P4 will be less. This results in enlarging the effective opening of the orifice 48 in the control unit 50 which reduces the pressure Pm in the actuator chamber 32. The pressure reduction in the chamber 32 causes the actuator piston 24 to be moved toward the left thereby causing closing movement of the throttle valve to decrease nozzle pressure P2. If cabin pressure P3 increases, flow through the orifice 78 will decrease whereby the pressure P4 will be increased to reduce the opening at the orifice 48, to increase the actuator pressure Pm whereby to open the throttle valve and increase the nozzle pressure P2. Thus, it will be seen that after setting the manually operable orifice valve 80 the control unit pressure P4 will remain substantially constant and will vary only in keeping with variations in cabin pressure P3 whereby to correct the nozzle pressure P2 accordingly to maintain a substantially constant rate of discharge.

The control unit pressure P4 can also be changed by adjustment of the manually operable valve 80 to vary the effective opening of the orifice 78. This valve adjustment is made only to select a level of nozzle pressure P2 to provide a desired discharge rate. That is, if the valve 80 is moved away from the orifice 78, the control unit pressure P4 will be reduced and the nozzle pressure P2 will also be reduced to decrease nozzle flow. If the valve 80 is moved toward the nozzle 78, P4 and P2 will increase as will the nozzle flow.

When the pilot desires to stop all nozzle flow, the valve 80 is retracted to fully open the orifice 78 whereby to reduce control unit pressure P4 and permit the orifice 48 to open fully which minimizes actuator pressure in the chamber 32. This permits the throttle valve 10 to be fully closed by the supply pressure P1 in the chamber 36. In order to assure movement of the diaphragms 60 and 62 toward the right to fully open the orifice 48 for the aforesaid purpose, a spring 82 is disposed in the control unit 50 to bias the said diaphragms toward the right, the bias being opposed by a spring 84 of less strength. It is necessary to rely upon spring movement of the diaphragms 60 and 62 when the pilot wants to close the throttle valve 10 under conditions where there is little if any nozzle pressure P2 which acts in the control unit to move the said diaphragms toward the right.

The invention claimed is:

1. In an aircraft air conditioning system which includes a conduit carrying air under pressure and a nozzle for discharging air into a compartment, the combination comprising a throttle valve disposed between the conduit and the nozzle and adjustable between open and closed positions, an actuator connected with the throttle valve having two chambers one of which communicates with the conduit for air supply to urge the throttle valve toward closed position and the other of which is connectible to a source of air under pressure for air supply to urge the throttle valve toward open position, the said source of pressurized air including conduit means having an orifice for controlling pressure in said other actuator chamber, an orifice control unit comprising a housing defining a pair of chambers, reciprocable means disposed in said housing between the chambers and movable relative to the orifice to vary its effective opening, one of said pair of chambers being connected with a source of air at substantially constant pressure and having an outlet, a manually operable valve movable relative to said outlet to select a substantially constant pressure in said one chamber of the control unit to urge the reciprocable means toward the orifice to reduce its effective opening, and the other chamber in said control unit being connected to the nozzle so that nozzle pressure in said other chamber urges said reciprocable means away from the orifice to enlarge its effective opening and thereby to decrease the air pressure in said other actuator chamber, whereby the throttle valve is movable toward closed position responsive to an increase in nozzle pressure and it is movable toward open position responsive to a decrease in nozzle pressure.

2. In an aircraft air conditioning system which includes a conduit carrying air under pressure and a nozzle for discharging air into a compartment, the combination comprising a throttle valve disposed between the conduit and the nozzle and adjustable between open and closed positions, an actuator connected with the throttle valve having two chambers one of which communicates with the conduit for air supply to urge the throttle valve toward closed position and the other of which is connectible to a source of air under pressure for air supply to urge the throttle valve toward open position, the said source of pressurized air including conduit means having an orifice for controlling pressure in said other actuator chamber, an orifice control unit comprising a housing defining a pair of chambers, reciprocable means disposed in said housing between said pair of chambers for movement relative to the orifice to vary its effective opening, one of said pair of chambers being connected with a source of air at substantially constant pressure and having an outlet in said compartment, a manually operable valve movable relative to said outlet to select a substantially constant pressure in said one of the pair of chambers to urge the reciprocable means toward the orifice to reduce its effective opening, and the other of said pair of chambers being connected with the nozzle whereby to urge the reciprocable means away from the orifice to enlarge its effective opening responsive to nozzle pressure and thereby to decrease the air pressure in said other actuator chamber, whereby the throttle valve is movable toward closed position responsive to an increase in nozzle pressure and it is movable toward open position responsive to a decrease in nozzle pressure.

3. In an aircraft air conditioning system which includes a conduit carrying air under pressure and a nozzle for discharging air into a compartment, the combination comprising a throttle valve disposed between the conduit and the nozzle for movement between open and closed position, an actuator connected with the throttle valve and having two chambers one of which communicates with the conduit for air supply to move the throttle valve toward closed position and the other of which communicates with the conduit for air supply to move the conduit toward open position, conduit means connected with said other chamber having an orifice for controlling pressure in said other chamber, an orifice control unit comprising a housing defining a pair of chambers, reciprocable means disposed in said housing between the chambers and movable relative to the orifice to vary its effective opening, one of said pair of chambers being connected with a source of air at substantially constant pressure and having an outlet, a manually operable valve movable relative to said outlet to select a substantially constant pressure in said one chamber of the control unit to urge the reciprocable means toward the orifice to reduce its effective opening, and the other chamber in said control unit being connected to the nozzle so that nozzle pressure in said other chamber urges said reciprocable means away from the orifice to enlarge its effective opening, whereby the throttle valve is movable toward closed position responsive to an increase in nozzle pressure and it is movable toward open position responsive to a decrease in nozzle pressure.

4. In an aircraft air conditioning system which includes a conduit carrying air under pressure and a nozzle for discharging air into a compartment, the combination comprising a throttle valve disposed between the conduit and the nozzle for movement between open and closed positions, an actuator connected with the throttle valve and having two chambers one of which communicates with the conduit for air supply to move the throttle valve toward closed position and the other of which communicates with the conduit for air supply to move the conduit toward open position, conduit means connected with said other chamber having an orifice for controlling pressure in said other chamber, an orifice control unit comprising a housing defining a pair of chambers, reciprocable means disposed in said housing between said pair of chambers for movement relative to the orifice to vary its effective opening, one of said pair of chambers being connected with a source of air at substantially constant pressure and having an outlet in said compartment, a manually operable valve movable relative to said outlet to select a substantially constant pressure in said one of the pair of chambers to urge the reciprocable means toward the orifice to reduce its effective opening, and the other of said pair of chambers being connected with the nozzle whereby to urge the reciprocable means away from the orifice to enlarge its effective opening responsive to nozzle pressure and thereby to decrease the air pressure in said other actuator chamber, whereby the throttle valve is movable toward closed position responsive to an increase in nozzle pressure and it is movable toward open position responsive to a decrease in nozzle pressure.

5. In an aircraft air conditioning system which includes a conduit carrying air under pressure and a nozzle for discharging air into a compartment, the combination comprising a throttle valve disposed between the conduit and the nozzle for movement between open and closed positions, an actuator connected with the valve and having two chambers one of which communicates with the conduit for air supply to move the throttle valve toward closed position and the other to which is connectible with a source of air under pressure which includes a conduit having an orifice for controlling pressure in said other chamber, an orifice control unit comprising a housing defining a pair of chambers, reciprocable means disposed in said housing between the chambers for movement relative to the orifice to vary its effective opening and thereby to vary the pressure in said other actuator chamber to move said throttle valve, conduit means communicating with said conduit and one of the pair of chambers to supply air thereto and including means for regulating pressure to a substantially constant level, means communicating with said one of the pair of chambers having an outlet, a manually operable valve movable relative to said outlet to select a substantially constant pressure for said one of the pair of chambers to urge said reciprocable means toward said orifice to reduce its effective opening, and the other of said pair of chambers being connected with said nozzle to supply air at nozzle pressure to urge said reciprocable means away from the said orifice, whereby an increase in nozzle pressure is effective to move said throttle valve toward closed position and a decrease in nozzle pressure is effective to move said throttle valve toward open position.

6. In an aircraft air conditioning system which includes a conduit carrying air under pressure and a nozzle for discharging air into a compartment, the combination comprising a throttle valve disposed between the conduit and the nozzle for movement between open and closed positions, an actuator connected with the valve and having two chambers one of which communicates with the conduit for air supply to move the throttle valve toward closed position and the other of which is connectible with a source of air under pressure for air supply to move the conduit toward open position, said source including conduit means communicating with said other chamber and having an orifice for controlling pressure therein, an orifice control unit comprising a housing defining a pair of chambers, reciprocable means disposed in said housing between the chambers for movement relative to the orifice to vary its effective opening and thereby to vary the pressure in said other actuator chamber to move said throttle valve, conduit means communicating with said conduit and one of the pair of chambers to supply air thereto and including means for regulating pressure to a substantially constant level, means communicating with said one of the pair of chambers having an outlet in said compartment, a manually operable valve movable relative to said outlet to select a substantially constant pressure for said one of the pair of chambers to urge said reciprocable means toward said orifice to reduce its effective opening, and the other of the said pair of chambers being connected with said nozzle to supply air at nozzle pressure to urge said reciprocable means away from the said orifice whereby an increase in nozzle pressure is effective to move said throttle valve toward closed position and a decrease in nozzle pressure is effective to move said throttle valve toward open position.

7. In a aircraft air conditioning system which includes a conduit carrying air under pressure and a nozzle for discharging air into a compartment, the combination comprising a throttle valve disposed between the conduit and the nozzle for movement between open and closed positions, an actuator connected with the valve and having two chambers one of which communicates with the conduit for air supply to move the throttle valve toward closed position and the other of which communicates with the conduit for air supply to move the conduit toward open position, conduit means connected with said other chamber having an orifice for controlling pressure in said other chamber, an orifice control unit comprising a housing defining a pair of chambers, reciprocable means disposed in said housing between the chambers for movement relative to the orifice to vary its effective opening and thereby to vary the pressure in said other actuator chamber to move said throttle valve, conduit means communicating with said conduit and one of the pair of chambers to supply air thereto and including means for regulating pressure to a substantially constant level, means communicating with said one of the pair of chambers having an outlet in said compartment, a manually operable valve movable relative to said outlet to select a substantially constant pressure for said one of the pair of chambers to urge said reciprocable means toward said orifice to reduce its effective opening, and the other of said pair of chambers being connected with said nozzle to supply air at nozzle pressure to urge said reciprocable means away from the said orifice, whereby an increase in nozzle pressure is effective to move said throttle valve toward closed position and a decrease in nozzle pressure is effective to move said throttle valve toward open position.

References Cited in the file of this patent

UNITED STATES PATENTS

| | | |
|---|---|---|
| 2,698,568 | Jensen | Jan. 4, 1955 |
| 2,723,615 | Morris et al. | Nov. 15, 1955 |